United States Patent Office 3,299,134
Patented Jan. 17, 1967

3,299,134
PROCESS FOR THE PREPARATION OF SULPHONYL ISOCYANIDE DICHLORIDES
Bertram Anders, Cologne-Stammheim, Engelbert Kühle, Bergisch-Gladbach, and Karlfried Dickoré, Leverkusen, Germany, assignors to Farbenfabriken Bayer Aktiengesellschaft, Leverkusen, Germany, a German corporation
No Drawing. Filed Nov. 19, 1964, Ser. No. 412,309
Claims priority, application Germany, Dec. 11, 1963, F 41,515
5 Claims. (Cl. 260—556)

It has now been found that sulphonyl isocyanidedichlorides may be obtained by reacting salts of sulphonyliminodithiocarbonic-acid or sulphonyl-isothiocyanates with chlorine or sulphuryl chloride at temperatures of $-10$ to $+100°$ C. if desired in an inert solvent.

As starting compounds for the process of the invention sulphonyliminodithiocarbonic-acid salts of the general formula $$R-SO_2-N=C\begin{matrix}SM\\ SM\end{matrix}$$

may be used, wherein R denotes an alkyl-, cycloalkyl- or aryl radical which may be substituted by halogen-, nitro-, alkyl-, aryl- or trifluoromethyl groups of the radical $$\begin{matrix}R_1\\ \diagdown\\ N-\\ \diagup\\ R_2\end{matrix}$$

and M denotes alkali-metal or ammonium ions and $R_1$ and $R_2$ separately represents lower alkyl radicals or may, together with the nitrogen atom, denote a heterocyclic ring which may also contain oxygen, sulphur or other hetero-atoms. These compounds may be prepared for example, from sulfonamides, carbon disulphide and an alkali metal hydroxide according to "Angewandte Chemie" 74 (1962) 753.

Alternatively, according to an earlier proposal of the applicants, these sulphonyliminodithiocarbonic acid salts may first be reacted with acid halides at temperatures of $-10$ to $+120°$ C., if desired in a solvent, to form the corresponding sulphonyl isothiocyanates of the general formula $$R-SO_2-N=C=S$$

wherein R has the meaning already given above. These sulphonyl isothiocyanates are then chlorinated.

The following are examples of starting compounds which may be used in accordance with the invention: Methane-, butane-, benzene-, 4-chlorobenzene-, 3:4-dichlorobenzene-, 2-methoxy-5-nitrobenzene-, 4-bromobenzene-, 4-fluorobenzene, p-toluene-, benzyl-, cyclohexane-, benzene-1:3-di-, o-xylene-$\omega$:$\omega$-di-, piperidyl-, pyrrolidyl-, quinoline-, naphthosultone-1:8-, N:N - dimethyl-sulphonyl-iminodithiocarbonic-acid sodium-, potassium-, ammonium salts and -isothiocyanates.

The sulphonylisocyanide-dichlorides obtained have the general formula $$R-SO_2-N=CCl_2$$

wherein R has the meaning already given above.

The following may, for example, be used as inert solvents:

Chlorinated hydrocarbons such as carbon tetrachloride, chloroform or chlorobenzene.

The process of the invention may be carried out at temperatures between $-10$ and $+100°$ C., preferably between 0 and $50°$ C. For example, suspensions of sulphonyliminodithiocarbonic-acid salts or solutions of the isothiocyanates may be treated in one of the above mentioned solvents with chlorine or sulphuryl cholride. When isothiocyanates are used, the reaction may be carried out without the use of solvents. The reaction mixture may in general be worked up by distillation. The sulphonyl isocyanide dichlorides then remain behind as oily liquids or solid residues.

The compounds obtainable according to the invention are new and may be used as intermediate products or as agents against pests, such as insects, for instance *Plutella maculipennis*, *Drosophila melanogaster* and *Myzus persicae*, and mites, for instance *Tetranychus urticae*.

The following compounds for example exhibit the indicated killing rates in percent, when used in the form of powders containing 5% of active ingredient in an amount of 40 kg/ha:

|  | Drosophila melanogaster killing rate after 24 hours |
|---|---|
| 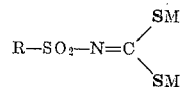 —$SO_2$—N=$CCl_2$ | 100 |
| $CH_3$—$SO_2$—N=$CCl_2$ | 100 |
|  —$SO_2$—N=$CCl_2$ | 100 |

Example 1

57 g of $Cl_2$ are passed into 75 g of benzenesulphonylisothiocyanate at $60°$ C. no solvent being added. The low boiling constituents are then removed by distillation in vacuo, benzene suphonylisocyanide-dichloride 122–125° C., 0.1 mm. Hg.

Example 2

60 g. of $Cl_2$ are passed into a suspension of 93 g. of benzene-suplhonyliminodithiocarbonic-acid -dipotassium salt in 500 cc. of $CCl_4$ at 15–20° C. The salt is then removed by filtration and the filtrate is freed from solvent. Benzenesulphonylisocyanide-dichloride of B.P. 122–125° C., 0.1 mm. Hg is obtained as residue.

Example 3

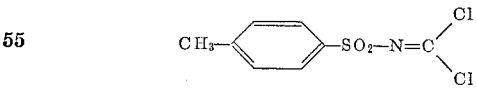

Chlorine is passed into a suspension of 323 g. of p-toluenesulphonyliminodithiocarbonic acid-dipotassium salt in 1 litre of carbon tetrachloride at room temperature until saturation is reached. The product is then filtered from the salt and the filtrate freed from solvent by distillation, p-toluene-sulphonylisocyanide dichloride being obtained as a crystalline residue. (251 g., M.P. 85° C.).

By an analogous method, the following sulphonylisocyanide dichlorides are obtained:

| Structure | Property |
|---|---|
| 2-methylphenyl-SO₂—N=CCl₂ | Oily. |
| phenyl-SO₂—N=CCl₂ | B.P. 0.1 mm. Hg., 122–125° C. |
| 4-Cl-phenyl-SO₂—N=CCl₂ | F.: 77° C. |
| 3,4-diCl-phenyl-SO₂—N=CCl₂ | F.: 78° C. |
| CH₃—SO₂—N=CCl₂ | M.P. 78° C. |
| phenyl-CH₂—SO₂—N=CCl₂ | M.P. 87° C. |
| (CH₃)₂N—SO₂—N=CCl₂ | M.P. 64° C. |

We claim:
1. A sulphonyl isocyanide dichloride of the formula

$$R-SO_2-N=CCl_2$$

wherein R is a member selected from the group consisting of lower alkyl benzyl, halobenzyl, cyclohexyl, toluyl, xylyl, phenyl, halophenyl, methoxyphenyl, nitrophenyl, piperidyl pyrrolidyl, quinolyl, naphthyl, phenylene, xylylene and dimethylamino.
2. Benzenesulphonylisocyanide dichloride.
3. Methylsulphonylisocyanide dichloride.
4. Dimethylaminosulphonylisocyanide dichloride.
5. 4-Chlorobenzenesulphonylisocyanide dichloride.

References Cited by the Examiner
FOREIGN PATENTS
896,323  5/1962  Great Britain.
908,733  10/1962  Great Britain.

OTHER REFERENCES

Beilsteins Handbuch der Organischen Chemie, volume 11, 4th ed., pages 43 and 86, Verlag Von Julius Springer, Berlin, Germany (1928).

JOHN D. RANDOLPH, *Primary Examiner.*